United States Patent [19]
Hicks

[11] Patent Number: 5,202,691
[45] Date of Patent: Apr. 13, 1993

[54] HICK'S PROBABILISTIC DATA ASSOCIATION METHOD

[75] Inventor: Richmond F. Hicks, Nashua, N.H.

[73] Assignee: The United States of America as represented by the Secretary of the Air Force, Washington, D.C.

[21] Appl. No.: 877,432

[22] Filed: Apr. 28, 1992

[51] Int. Cl.$^5$ ............................................. G01S 13/00
[52] U.S. Cl. ................................................. 342/90
[58] Field of Search .............................. 342/90, 95, 96

[56] References Cited

U.S. PATENT DOCUMENTS

| | | | |
|---|---|---|---|
| 3,893,112 | 7/1975 | Miller | 343/6.5 LC |
| 4,025,919 | 5/1977 | Jefferies et al. | 342/90 |
| 4,136,343 | 1/1979 | Heffner et al. | 343/117 R |
| 4,939,700 | 7/1990 | Breton | 367/88 |
| 4,989,186 | 1/1991 | Ricker | 367/97 |
| 4,992,795 | 2/1991 | Lassallette et al. | 342/90 |
| 5,068,664 | 11/1991 | Appriou et al. | 342/90 |

*Primary Examiner*—Mark Hellner
*Attorney, Agent, or Firm*—Irwin Garfinkle; Donald J. Singer

[57] ABSTRACT

A process, known as the Hick's Probabilistic Data Association Algorithm, correlates sensor measurement to target tracks under condition in which there are numerous false measurements. It accomplishes this by forming multiple hypotheses and computing a probabilistic score for each. The hypothesis with the high score is then used as a probability vector to update each target's track. The result is accomplished by combining the attributes of Joint Probabilistic Data Association (JPDA) and Nearest Neighbor Standard Filter (NNSF). This combination provides an improved algorithm which yields improved performance ever both prior art methods under high clutter conditions with crossing targets.

8 Claims, 3 Drawing Sheets

HICK'S PROBABILISTIC DATA ASSOCIATION METHOD

STATEMENT OF GOVERNMENT INTEREST

The invention described herein, may be manufactured and used by or for the Government for governmental purposes without the payment of any royalty thereon.

This invention provides a method and algorithm designed to improve tracking performance of radar systems under high clutter conditions. The algorithm specifically addresses the problem of data association in the presence of numerous false measurements.

BACKGROUND OF THE INVENTION

In the development of this invention the performances of several data association algorithms under high clutter operating conditions was explored. The algorithms studied included: nearest neighbor standard filter (NNSF), probabilistic data association (PDA), and joint probabilistic data association (JPDA). After observing the initial results from the simulation, this novel data association algorithm, referred to herein as the Hicks' Probabilistic Data Association (HPDA). This new HPDA algorithm was tested and compared with prior other algorithms and found to be superior under various operating conditions.

A Monte-Carlo simulation was executed for the three algorithms. The performance of each was evaluated by two methods. First, the average fraction of tracks lost was determined. A track is the computer predicted path of a target, and was declared lost when its position error exceeded the gate threshold by a specified threshold. The number of trials was chosen to yield a confidence of ±0.05. The second measure of effectiveness was the RMS position error. Once a track was declared lost, it was no longer used to calculate the RMS position error.

The Monte-Carlo simulations yielded some interesting results. The performances of PDA and NNSF crossed as the clutter density was increased, with NNSF having the better performance under dense clutter conditions. The explanation for this varying performance lies in the fact that there are two elements which control the performance of the algorithms.

The first characteristic of this simulation is the crossing target performance. NNSF uses a hit or miss type approach. It chooses the closest measurement and uses it to update the state. With two crossing targets it will be incorrect half of the time. JPDA on the other hand uses all of the measurements to form a weighted average which is then used to update the target's state. At point certain points, the measured target positions of two crossing aircraft may be too close for a clear distinction to be made between the two. JPDA uses a weighted average of the two measurements to update each target's state. This causes both tracked target positions to be very close until a point where a larger separation occurs. At such point, the measured target positions have separated enough for the tracker to make a clear distinction between the two targets, and then, the tracked positions begin to closely follow the true tracks. This results in improved performance in tracking crossing targets.

The other characteristic of this simulation is the high clutter performance. NNSF picks a single measurement to be used to update the state, and is either right or wrong. The probability that it is incorrect goes up linearly with increased clutter density. JPDA, however, uses all of the information to update the state, and under high clutter conditions, most of that information is incorrect. This leads to a rapid non-linear decay in performance which quickly decays further than NNSF.

By considering the joint likelihood of every measurement being associated with each target, it was hoped that a better decision could be made about which measurement should be attributed to each target. This should improve the crossing target performance, while avoiding the non-linear performance degradation.

OBJECTS OF THE INVENTION

It is the primary object of this invention to provide a method for improving the tracking performance of a Radar system under conditions of high clutter.

Another object of this invention is to provide a subroutine for a tracking system in which the subroutine will return to the system a probability vector to be used by the tracking program to update each target's position and velocity state.

Still another object of this invention is to provide an algorithm which specifically addresses the problem of data association in the presence of numerous false measurement.

A still further object of this invention is to provide a method for tracking a plurality of targets in the presence of noise by determining the likelihood of each measurement being associated with each target and then selecting the highest probability for each target.

For further objects and advantages of this invention, reference should now be made to the following detailed specification, and to the accompanying drawings in which.

DESCRIPTION OF THE PREFERRED EMBODIMENTS

Figure 1A:
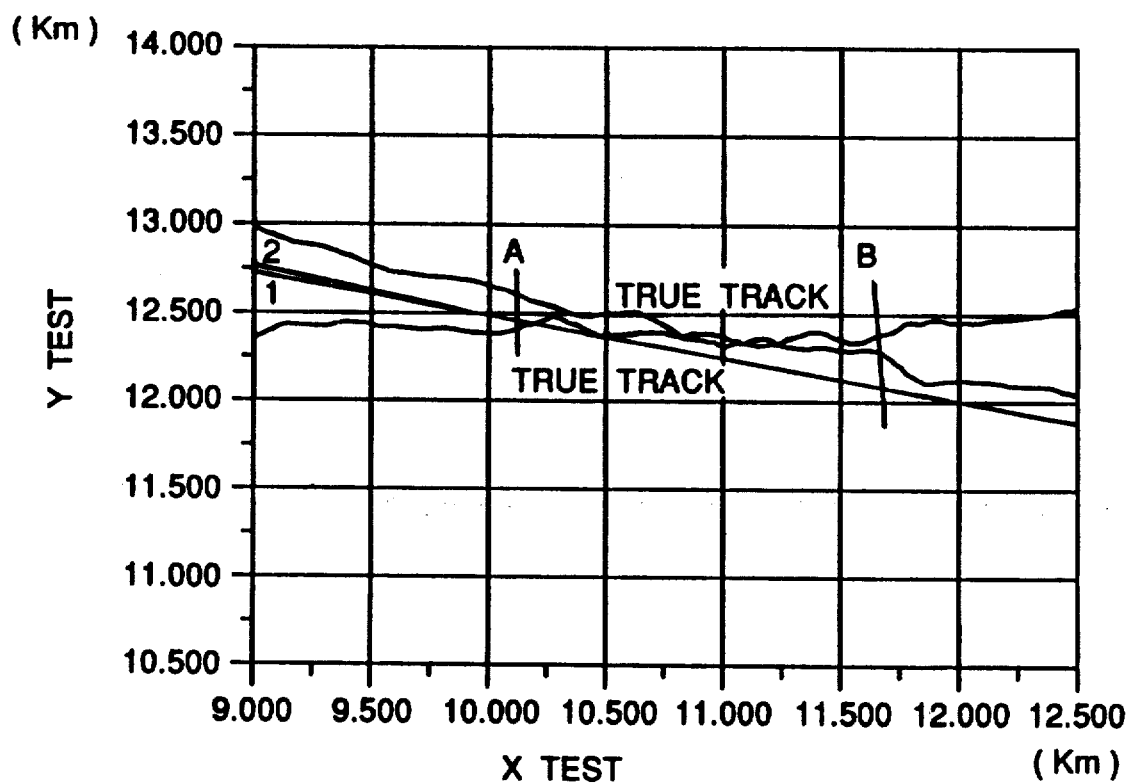
FIGS. 1a and 1b are illustrations of the problem which this method seeks to solve.
Figure 1B:
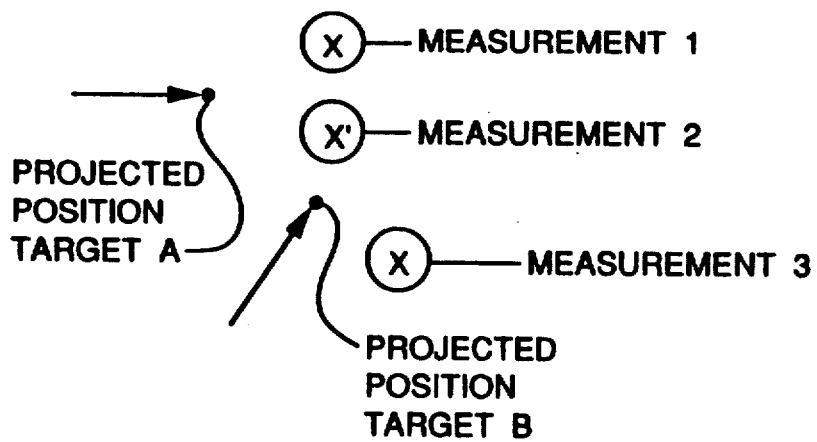

As already pointed out, there are two elements which control the performance of the prior art systems. The first characteristic is the crossing target performance. Referring to FIGS. 1a and 1b, with two crossing targets A and B, the NNSF method uses a hit or miss type approach. It chooses the closest measurement and uses it to update the state. Thus with two crossing targets the NNSF method will be incorrect half of the time. The JPDA method, on the other hand uses all of the measurements to form a weighted average which is then used to update the target's state. At point A, as shown in FIG. 1, the measured positions of the targets 1 and 2 are too close for a distinction to be made. The JPDA method uses a weighted average of the two measurement to update each targets state. This causes both tracked target positions to be very close until point B. At point B, the measured target positions have separated enough for the tracker to make a clear distinction between the two targets. At this point, the tracked positions begin to closely follow the true tracks. This results in improved performance in tracking crossing targets. This invention is an improvement over the prior methods, in that this method considers the joint likelihood of every measurement being associated with each target, so that a better decision may be made.

The invention is in the subroutine of a tracking system, which is part of the prior art. The system operates in accordance with the following steps:

Step 1: PDA probabilities are calculated and stored in a matrix in the following manner:

$$[B] = \begin{bmatrix} B_{01} & B_{02} & B_{03} & \cdots & B_{0t} \\ B_{11} & B_{12} & B_{13} & \cdots & B_{1t} \\ B_{21} & B_{22} & B_{23} & \cdots & B_{2t} \\ & & \vdots & & \\ B_{m1} & B_{m2} & B_{m3} & \cdots & B_{mt} \end{bmatrix}$$

where:
t = number of targets
m = number of measurements, and
m = 0 represents the predicted state
$B_{ij}$ = PDA association probability for measurement i to target j.

Step 2: Sort and store probabilities in the following manner:

$$[B] = [B_1 \; B_2 \; B_3 \ldots B_t]$$

$$\text{where } B_k = \begin{bmatrix} B_{0k} \\ B_{1k} \\ \vdots \\ B_{mk} \end{bmatrix} \text{ and}$$

$$k = 1, 2, 3 \ldots t$$

where the possibilities are sorted such that:

$$B_{0k} > B_{1k} > \ldots B_{mk}$$

Step 3: Store the measurement indices for each of the probabilities in a matching matrix as follows:

$$[I] = \begin{bmatrix} I_{01} & I_{02} & I_{03} & \cdots & I_{0t} \\ I_{11} & I_{12} & I_{13} & \cdots & I_{1t} \\ & & \vdots & & \\ I_{m1} & I_{m2} & I_{m3} & \cdots & I_{mt} \end{bmatrix}$$

where $I_{ij}$ is the measurement index k corresponding to $B_{kl}$

Step 4: Form a set of hypotheses through the following procedure:

```
count ← zero
clear measurement flags
target ← count1
count2 ← zero
measurement ← zero hypothesis(count2,target,measurement) ← zero
measurement ← measurements + one
if measurement  number of mesurements
```

```
done ← zero
measurement ← zero if done equal zero:
(if measurement flag not set:
(set flag
done ← one
hypothesis(count,target,measurement) ←
   measurement probability))
measurement ← measurement + one
if measurement < number of measurements target ← target + one if target < number of targets:
(target ← one)

count2 ← count2 + one if count2 < number of targets count1 ← count1 + one if count1 < number of targets end
```

Step 5: Compute a score for each hypotheses by finding the product of each hypothesis' measurement probabilities.
i.e.: if the hypotheses matrices are represented by:

$$H_r = \begin{bmatrix} h'_{01} & h'_{02} & h'_{03} & \cdots & h'_{0t} \\ h'_{11} & h'_{12} & h'_{13} & \cdots & h'_{it} \\ & & \vdots & & \\ h'_{m1} & h'_{m2} & h'_{m3} & \cdots & h'_{mt} \end{bmatrix}$$

where: $r = 1, 2, 3, \ldots t$ then $$S_r = \Pi \underset{i \; j}{\Sigma} h'_{ij}$$

Step 6: Find the highest score and set k to that score's index value such that $S_k$ corresponds to the highest score. Finally an association matrix is formed:

$$[A] = \begin{bmatrix} A_{01} & A_{02} & A_{03} & \cdots & A_{0t} \\ A_{11} & A_{12} & A_{13} & \cdots & A_{1t} \\ & & \vdots & & \\ A_{m1} & A_{m2} & A_{m3} & \cdots & A_{mt} \end{bmatrix}$$

where $$A_{ij} = \begin{cases} 1 & \text{if } h'_{ij} \neq 0 \\ 0 & \text{otherwise} \end{cases}$$

Step 7: Return the association to the tracking program to be used to update the position and velocity state of each target.

The invention is best explained by referring to the specific example outlined below, and shown in FIGS. 2 and 3 to which reference should now be made.

Figure 2:
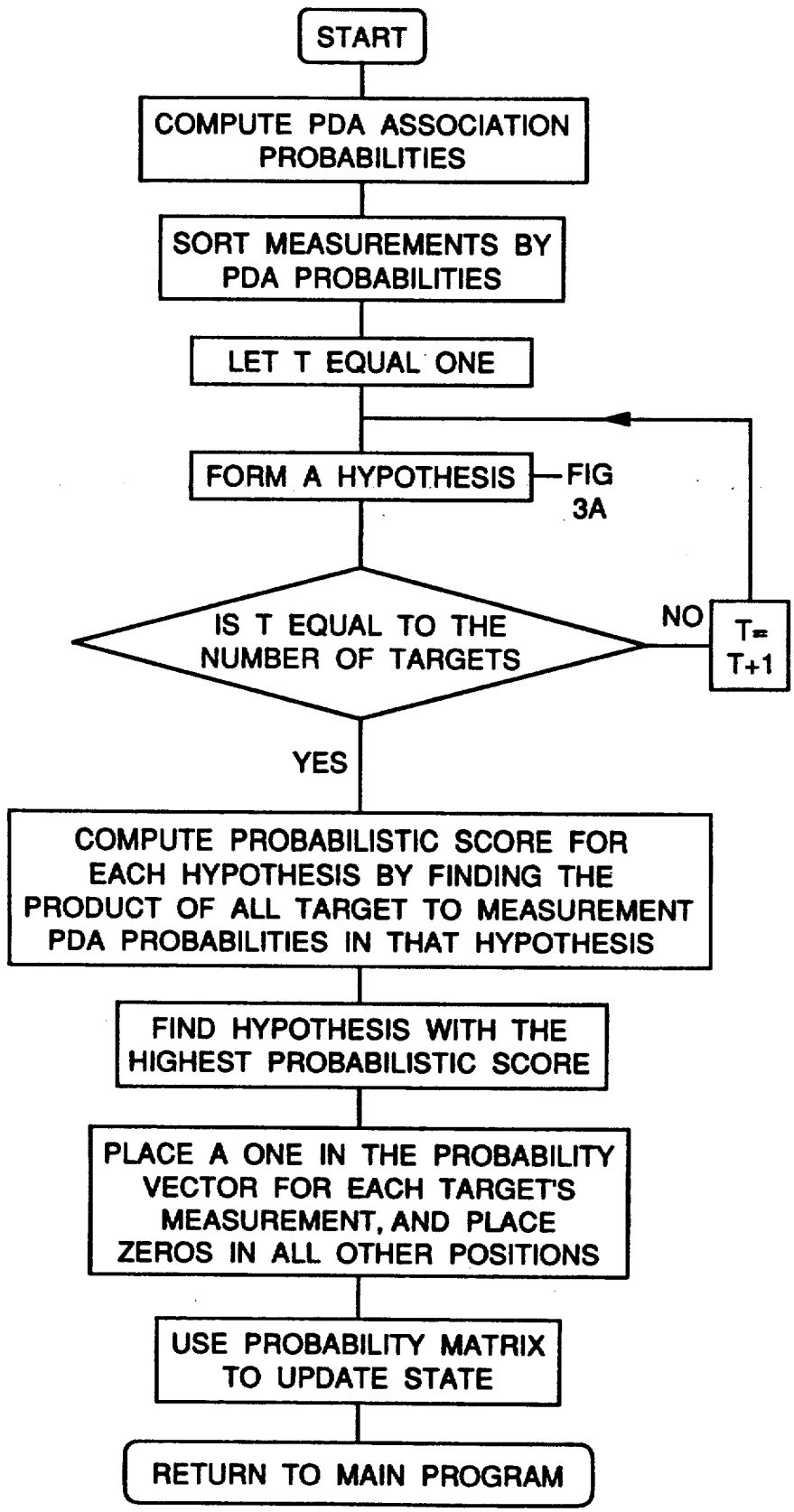
FIG. 2 is the flow chart showing the method of this invention.
Figure 3:
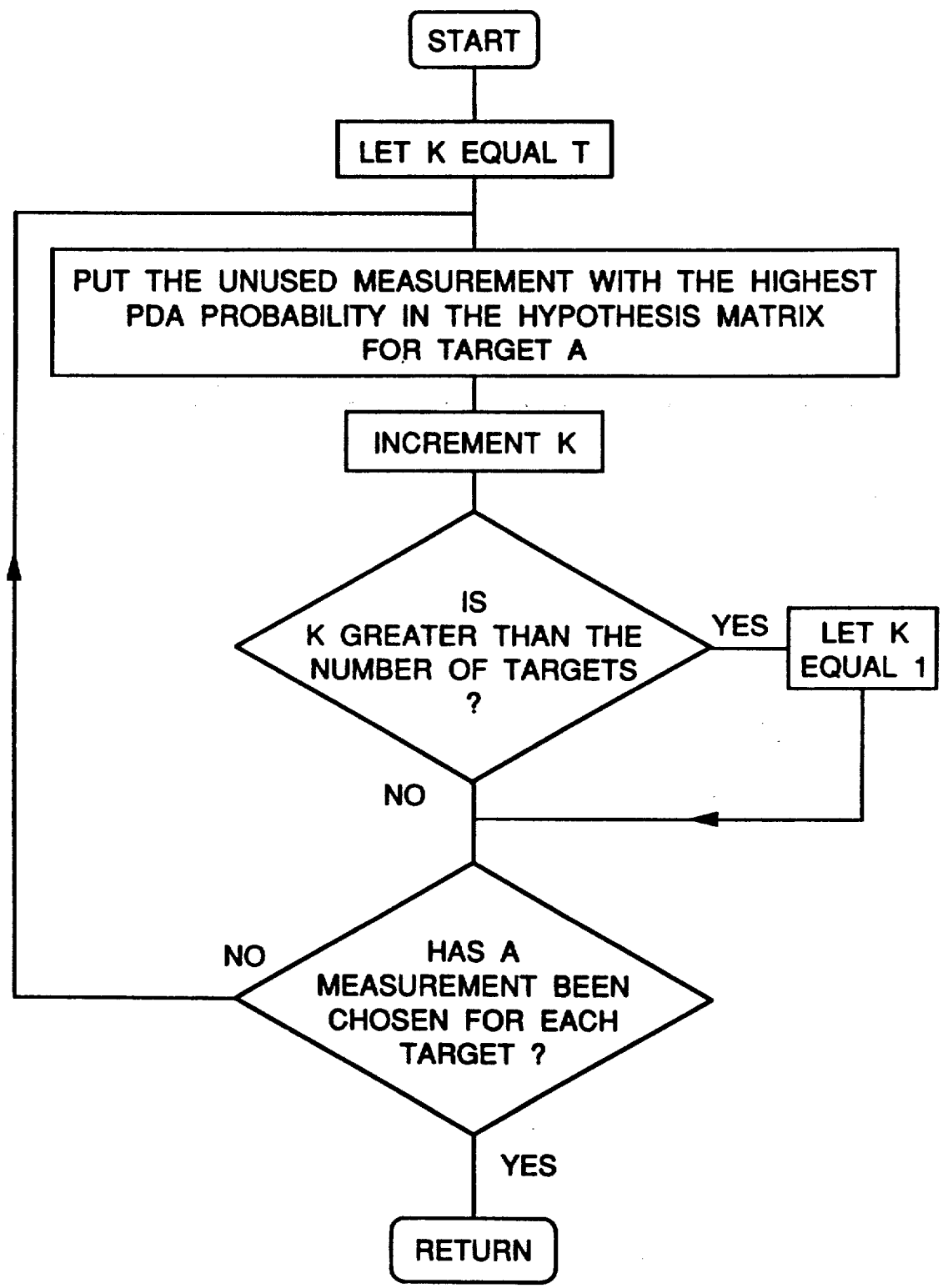
FIG. 3 is a detail of FIG. 2.

FIGS. 2 and 3 show a flowchart for method of this invention. The box in FIG. 2 designated as "Form a Hypothesis" (shown in detail in FIG. 3) is the modification of an existing tracking system. The tracking program of FIG. 2 provides the necessary information to calculate the PDA probabilities. The subroutine (FIG. 3) will return a probability vector to be used by the tracking program to update each target's position and velocity state.

Consider the two targets A and B and one clutter point being tracked by radar and which lie within the same gate. This yields two targets and three measurements and the problem is to determine which measurements relate to the targets. The first step is to compute the PDA association probabilities. This is accomplished in accordance with know prior art techniques taught by Bar Sholom and Tse in "Tracking In A Cluttered Environment With Probabilistic Data Association", Automatica 11 (1975), pp. 451–460.

In an illustrative example, the PDA (probabilistic data association) probabilities might be as follows:

|  | Target 1 | Target 2 |
|---|---|---|
| Measurement 0 | 0.01 | 0.10 |
| Measurement 1 | 0.45 | 0.70 |
| Measurement 2 | 0.42 | 0.12 |
| Measurement 3 | 0.12 | 0.08 |

Where measurement 0 is the predicted state, measurement 1 originated from target 2, measurement 2 originated from target 1 and measurement 3 originated from clutter.

The next step in the algorithm is to sort the measurements by their probabilities. This is accomplished in accordance with the disclosure of Bar Sholom and Fortmann, "Tracking and Data Association, Academic Press, San Diego, 1987, pp. 222-237. This would result in the following matrix:

| Target 1 | | Target 2 | |
|---|---|---|---|
| PDA | Index | PDA | Index |
| 0.45 | 1 | 0.70 | 1 |
| 0.42 | 2 | 0.12 | 2 |
| 0.12 | 3 | 0.10 | 0 |
| 0.01 | 0 | 0.08 | 3 |

Where the index refers to the measurement index and PDA refers to the probability of association which would be calculated by a PDA algorithm.

Starting with target 1, i.e., T=K=1, The next step is to form a hypothesis for each target (See FIG. 3). This is done by choosing the first unused measurement in each target's list, beginning with the first target. The PDA probability will be placed in a hypothesis matrix for the measurement which is chosen, and a zero will be placed in the matrix for all other measurements. The only measurement which may be used multiple times is the zero'th measurement since it corresponds to the predicted state. This operation would result in the following hypothesis matrix:

| Hypothesis 1 | |
|---|---|
| Target 1 | Target 2 |
| 0.0 | 0.0 |
| 0.45 | 0.0 |
| 0.0 | 0.12 |
| 0.0 | 0.0 |

Here measurement one was not associated with target 2 because it had already been associated with target 1.

The next step is to form a second hypothesis by beginning with the second target (by incrimenting K) and following the same procedure. This would result in the following hypothesis matrix.

| Hypothesis 2 | |
|---|---|
| Target 1 | Target 2 |
| 0.0 | 0.0 |
| 0.0 | 0.70 |
| 0.42 | 0.0 |
| 0.0 | 0.0 |

When an Hypothesis has been formed for each target, the system returns to the main program (see FIG. 2). The next step is to calculate a probabilistic score for each of the hypotheses by calculating the product of the PDA probabilities. This would result in a score of 0.054 for the hypothesis and 0.294 for the second.

The next step is to find the hypothesis with the highest score. In this case it is the second hypothesis. The probabilities in this hypothesis are then concerted to one or zero to form the probability matrix. This would result in the following probability matrix.

|  | Target 1 | Target 2 |
|---|---|---|
| Measurement 0 | 0 | 0 |
| Measurement 1 | 0 | 1 |
| Measurement 2 | 1 | 0 |
| Measurement 3 | 0 | 0 |

Finally, this matrix is used to update the state of each target.

This example demonstrates an improvement over NNSF. NNSF would have associated measurement 1 with target 1 and measurement 2 with target 2 as it only forms the first hypothesis and uses it to update the state vector. As one hypothesis is made for each target, it was expected that HPDA would have performance identical to NNSF for cases not involving crossing targets, because there will be no benefit to the additional hypotheses. Performance should be superior to NNSF but inferior to JPDA in the case of crossing targets, as a limited number of hypotheses are generated, and weighted averaging is not employed. Since the non-linear performance decay has been eliminated by the absence of weighted averaging, this algorithm should also outperform both NNSF and JPDA under high clutter conditions involving crossing targets.

ADVANTAGES AND NEW FEATURES

From the simulation results presented here it is apparent that HPDA offers an interesting compromise between the crudeness of NNSF and the complexity of JPDA. While HPDA has better performance than NNSF in scenarios which involve crossing targets, it also significantly outperforms JPDA in cases of high clutter density. HPDA also offers easy solutions to problems which cannot be overcome by JPDA without resorting to complex statistical analysis, such as redundant tracks and track initiation.

ALTERNATIVES

Another way HPDA might be used is in a system which calculates the clutter density and switches to HPDA under dense clutter conditions. This would allow JPDA to be used under low clutter conditions where the computational burden is not large, and when the burden exceeds the processor's ability, HPDA can be applied. The application of HPDA will reduce the computational burden while improving performance. This should lead to better overall system performance while minimizing computational burden.

It will be apparent to persons skilled in the art that this invention will be subject to various modifications and adaptations. It is intended, therefore, that the scope of the invention be limited only by the appended claims as read in the light of the foregoing specification and the prior art.

What is claimed is:

1. A method for improving the performance of a radar tracking system which includes means for acquiring measurements of moving targets in the presence of noise, said method comprising the following steps:
   generating a predicted state for each of a plurality of crossing targets;
   acquiring actual measurements of said targets along with noise;
   using actual measurements and predicted states of said targets, to calculate and store the Probabilistic Data Association (PDA) probabilities;
   sorting the PDA probabilities in a matching matrix;
   forming a hypothesis for each target using all possible assumptions as to which measurement represent said targets;
   calculating the probabilistic score for each of the hypotheses by calculating the product of the PDA probabilities; and
   selecting the probability with the highest product.

2. A method for improving the performance of a radar tracking system which includes means for acquiring measurements of moving targets in the presence of noise, said method comprising the following steps:
   generating a predicted state for each of a plurality of crossing targets;
   acquiring actual measurements of said targets along with noise;
   comparing the predicted states of said targets with said actual measurements to calculate and store the Probabilistic Data Association (PDA) probabilities;
   sorting the PDA probabilities in a matching matrix;
   forming a hypothesis for each target using all possible assumptions as to which measurement represent said targets;
   calculating the probabilistic score for each of the hypotheses by calculating the product of the PDA probabilities; and
   selecting the probability with the highest product.

3. A method for improving the performance of a radar tracking system which includes means for acquiring measurements of moving targets in the presence of noise, said method comprising the following steps:
   Step 1: Calculating and storing PDA probabilities in a matrix in the following manner:

$$<<B>> = \begin{bmatrix} B_{01} & B_{02} & B_{03} & \cdots & B_{0t} \\ B_{11} & B_{12} & B_{13} & \cdots & B_{1t} \\ B_{21} & B_{22} & B_{23} & \cdots & B_{2t} \\ & & \vdots & & \\ B_{m1} & B_{m2} & B_{m3} & \cdots & B_{mt} \end{bmatrix}$$

where:
t = number of targets
m = number of measurements, and
m = 0 represents the predicted state
$B_{ij}$ = PDA association probability for measurement i to target j;

Step 2: Sorting and storing probabilities in the following manner:

$$<<B>> = <<B_1 \; B_2 \; B_3 \ldots B_t>>$$

$$\text{where } B_k = \begin{bmatrix} B_{0k} \\ B_{1k} \\ \vdots \\ B_{mk} \end{bmatrix} \text{ and}$$

$$k = 1, 2, 3 \ldots t$$

where the probabilities are sorted such that:

$$B_{0k} \; B_{1k} > \ldots B_{mk},$$

Step 3: Storing measurement indices for each of the probabilities in a matching matrix as follows:

$$<<I>> = \begin{bmatrix} I_{01} & I_{02} & I_{03} & \cdots & I_{0t} \\ I_{11} & I_{12} & I_{13} & \cdots & I_{1t} \\ & & \vdots & & \\ I_{m1} & I_{m2} & I_{m3} & \cdots & I_{mt} \end{bmatrix}$$

where $I_{ij}$ is the measurement index k corresponding to $B_{k1}$;

Step 4: Forming a set of hypotheses through the following procedure:

```
count ← zero
   ↙
clear measurement flags
target ← count1
count2 ← zero
   ↙
measurement ← zero
   ↙
hypothesis(count2, target, measurement) ← zero
measurement ← measurements + one
if measurement < number of mesurements
```

```
done ← zero
measurement ← zero if done equal zero:
    (if measurement flag not set:
        (set flag
        done ← one
        hypothesis(count,target,measurement) —
            measurement probability))
    measurement ← measurement + one
    if measurement    number of measurements target ← target + one if target    number of targets:
    (target ← one)

count2 ← count2 + one if count2    number of targets count1 ← count1 + one if count1 < number of targets end
```

Step 5: Computing a score for each hypothesis by finding the product of each hypothesis' measurement probabilities;

i.e.: if the hypotheses matrices are represented by:

$$H_r = \begin{bmatrix} h'_{01} & h'_{02} & h'_{03} & \cdots & h'_{0t} \\ h'_{11} & h'_{12} & h'_{13} & \cdots & h'_{1t} \\ & & \vdots & & \\ h'_{m1} & h'_{m2} & h'_{m3} & \cdots & h'_{mt} \end{bmatrix}$$

where: $r = 1, 2, 3, \ldots t$ then $$S_r = \Pi \underset{i\ j}{\Sigma} h'_{ij}$$

Step 6: Finding the highest score and set k to that score's index value such that $S_k$ corresponds to the highest score;

Step 7. Forming and association matrix, as follows:

$$[A] = \begin{bmatrix} A_{01} & A_{02} & A_{03} & \cdots & A_{0t} \\ A_{11} & A_{12} & A_{13} & \cdots & A_{1t} \\ & & \vdots & & \\ A_{m1} & A_{m2} & A_{m3} & \cdots & A_{mt} \end{bmatrix}$$

where $$A_{ij} = \begin{cases} 1 & \text{if } h'_{ij} \neq 0 \\ 0 & \text{otherwise;} \end{cases}$$

Step 8: Returning the association to the tracking program to be used to update the position and velocity state of each target.

* * * * *